United States Patent [19]

Silverwater

[11] 4,205,703
[45] Jun. 3, 1980

[54] FLOW SENSOR RESPONSIVE TO FLUID WITHIN A RANGE FROM ABOVE A PREDETERMINED MINIMUM TO BELOW A PREDETERMINED MAXIMUM AND NONRESPONSIVE TO FLUID FLOWS BEYOND SAID RANGE

[75] Inventor: Bernard F. Silverwater, Plainview, N.Y.

[73] Assignee: Pall Corporation, Glen Cove, N.Y.

[21] Appl. No.: 6,059

[22] Filed: Jan. 24, 1979

[51] Int. Cl.$^2$ ............................................. F16K 37/00
[52] U.S. Cl. .................................. 137/557; 137/554; 116/268; 210/90
[58] Field of Search ............... 210/90; 137/554, 557, 137/551; 116/266, 267, 268

[56] References Cited

U.S. PATENT DOCUMENTS

| | | | |
|---|---|---|---|
| 2,935,040 | 5/1960 | Steenson | 116/268 |
| 3,077,176 | 2/1963 | Pall et al. | 116/267 |
| 3,094,969 | 6/1963 | Whiting | 116/268 |
| 3,128,743 | 4/1964 | Whiting | 210/90 |
| 3,212,471 | 10/1965 | Willis | 116/267 |
| 3,283,902 | 11/1966 | Farris et al. | 210/90 |
| 3,311,125 | 3/1967 | Beasley | 137/557 |
| 3,335,863 | 8/1967 | Silverwater | 116/268 |
| 3,495,566 | 2/1970 | Pall | 116/267 |
| 3,828,812 | 8/1974 | Read | 210/90 |

FOREIGN PATENT DOCUMENTS

891246  3/1962  United Kingdom ............... 116/267

*Primary Examiner*—Martin P. Schwadron
*Assistant Examiner*—A. Michael Chambers

[57] ABSTRACT

A flow sensor is provided, responsive to fluid flows within a range from above a predetermined minimum to below a predetermined maximum, to indicate that flow is within that range and the minimum flow has been exceeded, but nonresponsive to fluid flows below the predetermind minimum or above the predetermined maximum, to avoid giving a false indication of fluid flow, comprising a flow-responsive valve and a differential pressure indicator.

19 Claims, 2 Drawing Figures

FLOW SENSOR RESPONSIVE TO FLUID WITHIN A RANGE FROM ABOVE A PREDETERMINED MINIMUM TO BELOW A PREDETERMINED MAXIMUM AND NONRESPONSIVE TO FLUID FLOWS BEYOND SAID RANGE

Extraordinary demands are made upon the hydraulic systems of aircraft. The hydraulic fluids used must withstand temperature ranging from −65° F. to as high as 275° F., and occasionally even higher, and must be completely flowable and operative in the system under these conditions.

Wear and abrasion of parts result in the production of very fine particles, usually 0.05 to 1 micron in diameter. While these fine particles are so small that individually they cause no obstruction, there is nonetheless a tendency for sedimentation of such particles in regions where the rate of flow is rather low, and for collection of such particles in the small (often 5 microns or less) clearances in pump pistons, servo valves, actuators, valves and other components. In the course of time, serious obstructions can be built up even from such small particles. Indeed, it is the very fine particles that are usually responsible for pump failure in such systems.

It is now quite generally accepted that because of this, maintenance of a clean hydraulic fluid requires efficient filtration. It is a necessary corollary that one must be able to determine that the filter in the system is capable of removing very small particles and has a sufficient flow capacity to meet the flow requirements of the system. In normal flight, a flow of hydraulic fluid of the order of 5 to 12 gallons per minute or less may be sufficient, but whenever the landing gear flaps or other large hydraulically operated gear is operated, a higher flow rate can be required, considerably in excess of 12 gallons per minute under certain conditions. Flow capacity of a filter is of course a function of surface area, and in the limited space requirements of aircraft, it has only recently been possible to provide a filter element sufficiently rugged for hydraulic system service and having a fine enough incident particle removal rating, and a high enough flow capacity, to meet these requirements.

U.S. Pat. Nos. 3,262,563 patented July 26, 1966 to David B. Pall, 3,262,564 patented July 26, 1966, 3,262,565 patented July 26, 1966 and Canadian Pat. No. 742,051 patented Sept. 6, 1966, provide filter assemblies capable of removing a substantial proportion of very find particles, as small as 0.05 micron, as well as nearly all incident particles over 0.45 micron in diameter, and all incident particles over 3 microns in diameter, and capable of supplying a flow rate as high as may be desired upon demand. A filtered flow is provided at all flow rates, but at flow rates in excess of a predetermined maximum, only a portion of the flow is filtered through the primary filter element, of low micron removal rating, capable of removing all particles as small as 3 microns in diameter. The remainder is diverted by a flow control valve through a secondary filter of normal flow capacity and high micron removal rating, capable of removing most of the incident particles as small as particles 1.5 microns or larger in diameter, and all incident particles over 15 microns. The normal flow through the primary element is the maximum required, plus a safe margin, for normal operational flow in the system in which the element is installed. Only when extroadinary requirements are made upon the flow, beyond this maximum, does the flow control valve divert the incremental portion of the flow through the secondary (coarse or high micron removal rating) filter element. Since such extraordinary flow requirements are usually made only for short periods, less than 2 to 3% of the total flight time, the filter assembly of the invention effectively keeps the hydraulic fluid substantially free of particles larger than 0.45 micron in diameter, since any such particles that may enter the fluid during the times of extraordinary flow are removed later in the course of normal flow.

As a further feature, these filter assemblies provide for maintenance of a filtered flow through the secondary or coarse filter element whenever the primary element is clogged or so obstructed that the flowthrough results in a pressure differential across that element above a predetermined minimum. In this event, the flow control valve provided diverts through the secondary filter element flow above that which the partially or fully clogged primary element can pass.

A second by-pass as an optional feature is provided for the secondary filter element, so that when this element becomes clogged, or so obstructed as to increase the pressure differential across it to above a predetermined minimum, then all flow through the filter by-passes both the primary and the secondary filter elements. Normally, there is ample time after the primary element has become obstructed for the filter element to be serviced before the secondary filter element becomes clogged. Thus, the second by-pass line would come into use only in the event of an emergency of rather unusual character.

In certain systems, intolerant of any contaminant above 15 microns, it will be preferable to omit the by-pass valve around the secondary element, in which event the secondary element is preferably fabricated with internal support such that it will withstand full system pressure as a differential pressure across it.

For control of the diversion of fluid from the primary filter element at flow rates above the predetermined maximum, as well as diversion whenever the primary filter element becomes obstructed so that the pressure differential across it reaches a predetermined minimum, there is provided a flow valve of the orifice or venturi type, so designed as to be actuated by an increase in the velocity of flow through the valve. Since this increase in velocity is proportional to the amount of fluid and therefore the pressure of fluid applied on the inlet side of the valve, the valve is responsive to changes in flow volume and consequently to changes in flow demand made upon the filter assembly of the invention. This valve is placed in the line of flow between the inlet to the filter assembly, and the primary filter element. Preferably, the valve is placed in an inlet passage.

Pressure indicators can be provided, indicating the reaching of a predetermined pressure differential across the primary filter element, and across the secondary filter element, so that an indication is given to the operator that the primary or secondary filter element or both have become clogged, and require servicing.

Pressure indicators have the fault, however, that they cannot distinguish between pressure differential arising from clogging of a filter element, and pressure differentials arising from a higher flow rate across the orifice or venturi of the flow control valve. When a higher flow rate is required a sudden flow surge results which may lead to accidental actuation of the pressure indicator designed to indicate abnormal pressure drop in the system. Pressure indicators therefore can give false indication of filter clogging or other monitored condition, during periods of peak flow demand.

U.S. Pat. No. 3,335,863 patented Aug. 15, 1967, to Bernard F. Silverwater provides a differential pressure indicator that is less sensitive or even insensitive to flow surges, and yet detects any changes in static pressure due to resistance across a filter element or between any two points in the same of different systems. A changed or controlled response to flow surges is obtained by combining the indicator with a response control or converting means adapted to interchange velocity head and static head, and thus alter the static pressure component by an amount proportionate to the change in the velocity head component of the flow surge. One of the fluid lines leading from the pressure indicator is connected with the response control means by tapping the zone thereof of greatest changed static head in a manner to respond only to the changed static pressure component. Such response can be obtained by any of several techniques, including design of the response control means, and the design of the fluid circuit between the response control means and the pressure indicator. A valve can be combined with the response control means to isolate the pressure indicator from the fluid system thus rendering the indicator insensitive to flow surges.

The Silverwater device is effective but only over a small flow range; otherwise, the pressure losses become excessive. It is effective when used to measure viscous pressure drops such as across filter elements and to negate the effects of high flows of short duration through a partially blocked filter element. This eliminates premature element replacement.

In accordance with the invention a flow sensor is provided responsive to fluid flows within a range from above a predetermined minimum to below a predetermined maximum to indicate that flow is within that range and that the minimum flow has been exceeded but nonresponsive to fluid flows below the predetermined minimum or above the predetermined maximum to avoid giving a false indication of fluid flow, comprising, in combination:

(1) a housing having a inlet and an outlet and a through flow fluid passage therebetween;

(2) a flow responsive valve disposed across the fluid passage in a manner to control flow therethrough, comprising
   (a) a valve seat;
   (b) a valve member movable towards and away from the valve seat and having opposed faces receiving fluid pressure upstream and downstream, respectively, of the valve member;
   (c) bias means biasing the valve member into a normally closed position against the valve seat with a force resisting upstream fluid pressure against the valve face tending to open the valve up to a predetermined maximum;
   (d) a flow controlling orifice preferably through but optionally bypassing or beside the valve member and open to flow past the valve member between the housing inlet and outlet at all times; and
   (e) at least one fluid flow passage for flow past the valve member that is closed when the valve member is against valve seat and open when the valve member is moved away from the valve seat;

(3) a differential pressure indicator having:
   (a) cooperating actuating and indicating magnetic elements, the actuating element movable between a first position in which it retains the indicating element in a nonindicating position and a second position in which the indicating element can move into an indicating position; the actuating element having opposed pressure faces and being movable towards one of the two positions according to the pressure differential therebetween;
   (b) a first fluid passage communicating upstream fluid pressure in the housing fluid passage before the valve member to the first pressure face and a second fluid passage communicating fluid pressure in the housing fluid passage after the valve member to the second pressure face;
   (c) bias means retaining the actuating element in a first position to retain the indicating element in a nonindicating position at pressure differentials thereacross up to a predetermined minimum; and at pressure differentials exceeding the minimum to move away from the indicating differentials exceeding the minimum to move away from the indicating element and release it to signal the reaching of such minimum pressure differential;
   (d) means in the second fluid passage delaying communication of fluid pressure therethrough to prevent actuation of the actuating element when the valve opens while flow is increasing from the flow permitted while the valve is closed to the flow permitted while the valve is open;

(4) the valve member when moved away from the valve seat reducing the measured pressure differential between the first and second fluid passages to below said predetermined minimum thereby preventing actuation of the differential pressure indicator while the valve member remains in the open position and the fluid flow continues above the predetermined maximum, the differential pressure indicator accordingly responding only while fluid flow is below the predetermined maximum and above the predetermined minimum.

In a preferred embodiment, the flow responsive valve has a valve member such as a poppet biased against a valve seat, and the poppet has an orifice or throat such as a venturi considerably reducing the diameter of the passage available for flow, such as in the inlet passage, and as a consequence of this reduction in diameter, the velocity of flow through the valve poppet orifice increases.

However, it is also possible to provide an orifice, venturi or narrow passage by-passing the valve member, such as a poppet, in the housing beside the valve member, and in parallel thereto, linking the upstream and downstream fluid flow passages on each side of the valve member. Such a flow passage can provide the necessary pressure drop and cause the valve member to open at a predetermined pressure drop due to flow.

The total pressure in the fluid remains constant, and is the sum of the static pressure and the velocity pressure. Hence, an increase in the velocity pressure at any point will result in a decrease in the static pressure at that point. Under normal flow conditions, a steady state exists in which the force due to the high static pressure on the inlet side of the valve member, such as a poppet, is less than the total force holding the valve member in place, and the valve member remains stationary. However, when the flow volume and hence rate increases, the velocity of flow through the orifice increases, and results in a reduction in static pressure at the orifice, which reduces the force tending to hold the valve member stationary against the inlet flow. The valve member is designed to be actuated whenever the reduction in static pressure across the orifice falls below a predetermined minimum.

The valve is so positioned in the fluid line, such as the inlet passage, as under normal flow conditions to close off the line to all flow except that accommodated by the orifice or venturi and bypassing the valve member. The result is that all flow must pass through the orifice or venturi of the valve member. At a predetermined pressure differential in static pressure between the valve face or inlet side of the valve and the other side of the valve, the minimum value of which is determined by the flow requirements of the system, the valve is actuated in a manner to fully open the passage between the inlet and outlet.

The amount of opening can be designed to be proportional to the magnitude of the pressure differential, and thus the amount of bypass flow can be made directly dependent upon the rate of flow. While the valve is open, flow continues, but flow through the orifice after cracking is dependent on the design of the valve member. For example, if the loaded valve member exposes a larger upstream pressure area after cracking, the differential pressure across the valve will be reduced, and hence there will be less flow through the orifice. In any case, at all positions of the valve member there is flow supplied to and through the fluid passage.

A preferred embodiment of the flow responsive valve comprises structurally a poppet reciprocatingly mounted in the passage and biased by a compression spring against a valve seat in a position to partially close off the flow passage, and a constricted flow passage through the poppet in the form of an orifice or inefficient venturi connecting the inlet with the outlet in all positions of the poppet. The pressure exerted by the compression spring against the poppet can be adjusted as required, and the dimensioning of the orifice or inefficient venturi is matched with the compressive force of the spring, and the dimensioning of the pressure chambers and surface area of the poppet exposed therein to fluid pressure, so as to obtain actuation of the valve poppet at the predetermined pressure differential (due to flow) in static pressure across the orifice.

While spring biased means is preferred, magnetic, electrostatic or electromagnetic biasing means can also be used. In the case of magnetic or electrostatic means, twin magnets can be used at each extremity of reciprocation of the poppet, and the poppet itself can be magnetic, oriented so as to be attracted to the magnet holding the poppet in the closed position and repelled by the magnet holding the poppet in the open position, and both magnets are so placed that the poppet at each extremity is within the field of both magnets. Thus reseating of the poppet in the closed position is ensured when the flow is returned to normal. In the case of electromagnetic biasing means, the coil windings can be varied to provide the required biasing forces.

In another embodiment, the valve poppet can also be designed to be actuated by a fluid pressure against the inlet face of the orifice whenever the pressure drop across a filter reaches a predetermined maximum. This is done by shaping the inlet face of the valve poppet to a larger surface area than the combined surface area in the pressure chamber and facing the passage on the outlet side of the poppet. Thus, whenever the fluid pressure on the inlet face exceeds the pressure in the passage closed off by the poppet by a predetermined amount, the valve poppet is actuated, just as in the case of a predetermined excessive static pressure differential.

In this embodiment the differential pressure indicator pressure taps will be placed so as to only measure the pressure due to flow and be insensitive to differential pressures, due to a contaminated filter element, for example.

Thus, the valve can be designed to actuate, in the preferred embodiment, whenever the fluid flow through the passage exceeds a predetermined maximum, so that the total pressure differential between the inlet passage and the outlet passage across the poppet exceeds a predetermined minimum. Thereupon, the valve poppet is actuated.

Those skilled in the art are aware of the parameters to be taken into account in determining the diameters of orifices or venturi passages. The exact dimensions for the valve poppet faces and passages must be determined for each particular system, but this is readily accomplished by standard design and calculation.

The flow valve can be constructed of any durable material inert to the fluid being circulated through the system. Metal valves, such as those made of aluminum, stainless steel, and other stainless alloys, are preferred, but it is also possible to fabricate the valve from synthetic polymers and cellulose derivatives, such as polytetrafluoroethylene, polypropylene, polyethylene, polystyrene, nylon, polyoxymethylene, acrylonitrile rubbers and fluorocarbon rubbers.

In accordance with the invention a differential pressure indicator is combined with the flow responsive valve in a manner so as to sense differential fluid pressure across the valve when the valve member is in the closed position but not when the valve member is in the open position.

For this purpose, the high pressure tap of the differential pressure indicator senses the fluid pressure upstream of the valve member, such as a poppet, which is equal to the total pressure in the orifice as measured on the downstream side. The low pressure tap senses the pressure on the downstream side of the valve member seat when the valve is closed. When the valve cracks, the valve member just moves off the seat, and the downstream tap senses the higher total pressure upstream of the valve (minus some velocity head losses). The differential pressure from crack open to full open is less than the preset indicating pressure, and hence the indicator will not actuate. In order to prevent false actuation in the interval of time required to go from leakage flow to operational flow, the differential pressure indicator must have a time delay mechanism. This is provided by orifice 56a in passage 56 of the device shown in FIGS. 1 and 2, as an Example.

The differential pressure indicator comprises, in its broadest aspect, a housing, a first fluid passage in the housing communicating with fluid pressure above the valve member, a second fluid passage in the housing communicating with fluid pressure the downstream of the valve member; an indicating magnetic element in the housing for movement into and from an indicating position, and an actuating magnetic element normally retaining the indicating element in a nonindicating position but responsive to changes in pressure between the two fluid passages to release the indicating element for movement into an indicating position.

The indicating and actuating magnetic means can be any of those well-known in the indicator art. The preferred form is the magnetic form disclosed in U.S. Pat. No. 2,942,572, dated June 28, 1960, to David B. Pall. This device comprises a piston means movably mounted in the housing, first magnetic means movable with the piston means toward and away from a first position, bias means urging the piston means in one direction and normally retaining the first magnetic means in the first position, fluid duct means communicating with a source of fluid under pressure and with one end of the piston means to urge it in the opposite direction, second magnetic means movable toward and away from the first magnetic means and normally retained toward the first magnetic means by magnetic attraction when the first magnetic means is in the first position, and bias means urging the second magnetic means away from the first magnetic means selected to overcome the force of magnetic attraction when the first magnetic means is more than a predetermined distance away from the second magnetic means.

Also useful are the diaphragm type devices described in U.S. Pat. No. 3,077,176 to D. B. Pall et al., dated Feb. 12, 1963. These devices include a flexible magnetic diaphragm assembly movably mounted in the housing, toward and away from a first position, bias means urging the diaphragm assembly in one direction and normally retaining the same in the first position, fluid duct means communicating with a source of fluid under pressure and with one face of the diaphragm assembly to urge it in the opposite direction, magnetic means movable toward and away from the magnetic diaphragm assembly and normally retained toward the assembly by magnetic attraction when the assembly is in the first position, and bias means urging the magnetic means away from the assembly selected to overcome the force of the magnetic means when the assembly means is more than a predetermined distance away therefrom.

U.S. Pat. No. 3,140,690 patented July 14, 1964 provides a device having a first magnetic means arranged to attract a second magnetic means so long as the two means are separated by less than a predetermined distance, and bias means to propel the second magnetic element to an indicating position whenever that distance is exceeded. Retention of the second element in either the attracted or the indicating position, or both, is ensured by a third magnetic means arranged so as to attract the second magnetic means so long as it is in the first position, and/or to attract the second magnetic means so long as it is in the indicating position. This type of device can also be used.

Figure 1:
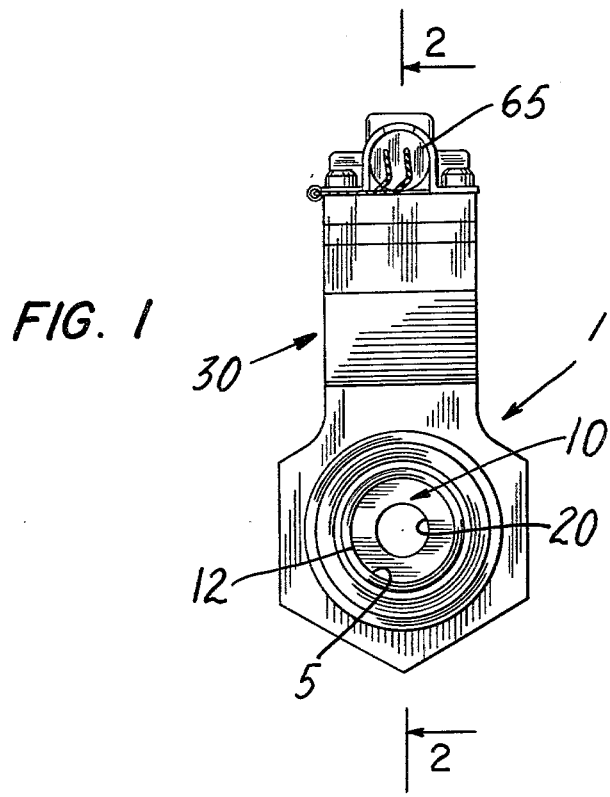
FIG. 1 shows a top view of the flow sensor of the invention.
Figure 2:
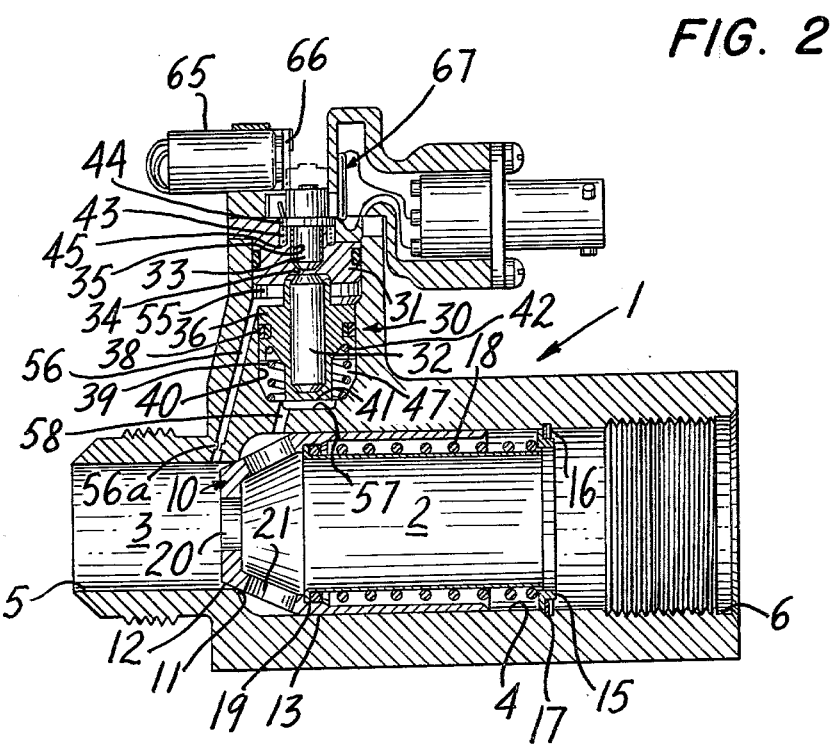
FIG. 2 is a longitudinal section of the flow sensor of FIG. 1, taken along the line 2—2, and looking in the direction of the arrows.

The flow sensor shown in FIGS. 1 and 2 has a housing 1 with a through fluid flow passage 2 divided into two parts: the narrower portion in the cylindrical bore 3 includes the housing inlet 5 and the portion of larger diameter in cylindrical bore 4 includes the housing outlet 6.

Disposed across the line of flow through the fluid passage is a hollow flow-responsive bypass poppet valve 10, spring-biased into a normal position shown in FIG. 2 in which it is seated against a valve seat 11, at the stepped junction between the bores 3 and 4. The valve poppet 10 is tubular, with tapered end walls 12, and cylindrical side walls 13 that fit snugly against the walls of the bore 4 in a sliding fit, so that the valve 10 can move reciprocably towards and away from the valve seat 11 in the bore.

The support ring 15, held in place by the lock ring 16 which fits in the groove 17 of the bore 4, retains one end of a compression spring 18, the other end of which is nested in the peripheral recess 19 of the valve poppet. The spring 18 accordingly biases the valve poppet 10 against the valve seat 11.

The tapered end walls 12 of the valve poppet are provided with a plurality of apertures, permitting fluid flow in passage 2 from bore 3 to bore 4 at all times, through those apertures exposed according to the position of the poppet. In the position shown in FIG. 2, the central aperture 20 constitutes a restricted flow orifice across the through passage 2 that is open at all times to fluid flow, and is sized to accommodate normal flow in the passage. An array of apertures 21 are normally downstream of the valve seat 11, and are not open to fluid flow until the valve poppet is driven away from its seat 11. Accordingly, the apertures 21 are sized to accommodate bypass flow, when the valve poppet 10 is open.

In the embodiment shown, the size of the central aperture 20 is chosen to carry a normal flow of up to 12 gals per minute ±2 gals per minute. When supplemented by the array of apertures 21 with the valve poppet 10 in the open position, the valve poppet can accommodate full bypass flow, extending for example up to 84 gpm at 40 psi pressure differential at 100° F. plus −10° F., with MIL-H-5606 or MIL-H-83282 fluid flowing through the passage 2.

Disposed at right angles to the fluid passage is a third and blind bore 40 with which is placed a flow sensor 30 in accordance with the invention. The flow sensor 30 has a housing 31 in which are disposed an actuating magnetic element or piston 32 and an indicating magnetic element or piston 33 separated by a wall 34, with no fluid communication (between bore 40 and 35) thereacross.

The indicating element 33 moves reciprocably in a blind bore 35 in the housing 31 between the nonactuated position shown in FIG. 2, and an actuated position in which it extends from the housing approximately 3/16th inch, giving in that position a visual indication of the actuation of the flow sensor.

The actuating element 32 is carried in a cylindrical sleeve 36 movable reciprocably in the blind bore 40 of the housing 1, a leak-tight seal with the walls thereof being provided by the O-ring 38. A compression spring 39, one end of which is seated against the base 41 of the blind bore 40 and the other end of which is seated against the projecting portion 42 of the sleeve, tends to hold the actuating element 32 with its upper end against the wall 34, as shown in FIG. 2. In that position, the actuating element 32 magnetically attracts the indicating element 33, and retains it in the position shown in FIG. 2 by the force of magnetic attraction.

The indicating element 33 is spring-biased towards the actuated position by way of the compression spring 43, one end of which is seated against the flange 44 of the indicating element 33 and the other against the annular recess 45 in the indicator housing. While the actuating element 32 is in the position shown in FIG. 2, the force of magnetic attraction between the actuating element 32 and the indicating element 33 is sufficient to retain the indicating element against the wall 34, but whenever the actuating element is moved a sufficient distance away from the wall, the force of magnetic attraction no longer is able to overcome the biasing force of the spring 43, and the indicating element 33 pops into the indicating position.

The sleeve 36 divides the chamber 47 between the indicator housing 31 and the blind bore 40 into two parts, an outer part 55, in fluid communication via the passage 56 with the bore 3, and sensing fluid pressure in passage 2 at the inlet side of the poppet 10. An orifice 56a in passage 56 restricts fluid communication from passage 3 the outer part 55, providing a time delay in response to pressure changes. An inner part 57 is in flow communication via the passage 58 with the bore 4 sensing fluid pressure in passage 2 downstream of the valve poppet.

Under normal fluid flow, accommodated by the orifice 20 in the valve poppet 10, the flow sensor 30 is not actuated. If however fluid flow increases, and exceeds a predetermined minimum, in this case, 12 gpm±2 gpm, the increase in pressure in bore 3 is sensed in the upper portion 55 of the chamber 47 via passage 56. Due to the flow restriction imposed by the orifice 20, downstream pressure in bore 4 is less than upstream pressure by a pressure differential that increases as flow increases. At 12 gpm±2 gpm the pressure differential at which the actuating element 32 moves away from the wall 34 is reached, the actuating element 32 moves away, and the indicating element 33 is popped by spring 43 to the indicating position.

However, at pressures and/or flows in excess of 12 gpm±2 gpm at which th valve poppet 10 is opened to provide bypass flow, the flow sensor 30 is not actuated. This is because when the valve poppet 10 is away from the valve seat 11, the passages 56 and 58 each communicate approximately the same pressure to chambers 55 and 57, respectively, so there is an insufficient pressure differential therebetween to actuate the indicator.

Assume downstream pressure equals zero psig, and the spring has a low force rate, and $A_1 In^2 = \frac{1}{2} A_2 in^2$ $A_1$ = pressure at face $A_1$ of the poppet 10 (before cracking)

$A_2$ = pressure across entire face of the poppet 10 (after cracking).

Pressure Force $F_1$ = spring force at cracking

Pressure Force $F_1 = A_1$ pressure upstream before cracking

Pressure Force $F_1 = \frac{1}{2} A_2 \times$ pressure upstream after cracking

Then, the poppet will crack and then snap open if the upstream pressure remains constant. The reason for this is the upstream pressure immediately after cracking acts on two times the area prior to cracking and the resultant force is opposite to and two times as large as the opposite biasing spring force and quickly opens the valve. When the valve is wide open the pressure loss across the seat is minimal and the differential pressure sensed by the differential pressure indicator is insufficient to actuate it. A time delay device of sufficient duration is required in the differential pressure indicator so that it will not sense transitional flow surges when the valve poppet is near the seat immediately after cracking.

In addition to giving a visual indication, the indicating element 33 can also be made to actuate an electric switch. One arrangement for doing so is shown in FIG. 2. In this case, the indicating element 33 which is a magnet whose field closes the magnetic contacts of the reed switch 67 when in the indicating position and releases (opens) the contacts when in the nonindicating position.

The flow sensor 30 is provided with an electric lockout to prevent actuation whenever desired, such as during flight. This lockout is in the form of a solenoid 65, having a plunger or detent 66 which when the solenoid is deenergized projects into the path of the indicating element 33, and prevents it from moving to the actuated position, in which it projects from the housing. When it is desired that the flow sensor be operative, the solenoid is energized, withdrawing the projecting plunger or detent 66, and permitting the indicating element 33 to move into the actuated position or indicating position when the flow sensor 30 is actuated.

Having regard to the foregoing disclosure, the following is claimed as inventive and patentable embodiments thereof:

1. A flow sensor responsive to fluid flows within a range from above a predetermined minimum to below a predetermined maximum to indicate that flow is within that range and that the minimum flow has been exceeded but nonresponsive to fluid flows below the predetermined minimum or above the predetermined maximum to avoid giving a false indication of fluid flow, comprising in combination:
   (1) a housing having an inlet and an outlet and a through flow fluid passage therebetween;
   (2) a flow responsive valve disposed across the fluid passage in a manner to control flow therebetween, comprising;
      (a) a valve seat;
      (b) a valve member movable towards and away from the valve seat and having opposed faces said member including means for receiving downstream fluid pressure on a downstream face,
      (c) bias means biasing the valve member into a normally closed position against the valve seat with a force resisting upstream fluid pressure against upstream valve face tending to bias the valve downstream;
      (d) said means for receiving downstream fluid pressure including a flow controlling orifice open to flow past the valve member between the housing inlet and outlet at all times; and
      (e) a first fluid flow passage downstream of the valve seat and in communication with fluid pressure through said orifice, said valve member including bore means for communicating said downstream fluid pressure to said first passage;
   (3) a differential pressure indicator having
      (a) cooperating actuating and indicating magnetic elements, the actuating element movable between a first position in which it retains the indicating element in a nonindicating position and a second position in which the indicating element can move into an indicating position; the actuating element having opposed pressure faces and being movable towards one of the two positions according to the pressure differential therebetween;
      (b) said first passage communicating fluid pressure to one of the actuating element pressure faces, and a second fluid passage communicating fluid pressure upstream of the valve member to the other pressure face;
      (c) bias means retaining the actuating element in a first position to retain the indicating element in a nonindicating position at pressure differentials thereacross up to a predetermined minimum; and at pressure differentials exceeding the minimum to move away from the indicating element and release it to signal the reaching of such minimum pressure differential; and (d) means in the second fluid passage delaying communication of fluid pressure therethrough to delay actuation of the actuating element.

2. A flow sensor according to claim 1 in which the flow-controlling orifice is an orifice through the valve member.

3. A flow sensor according to claim 1 in which the valve member is a poppet biased against a valve seat, and the flow-controlling orifice is an orifice through the poppet.

4. A flow sensor according to claim 1 in which the valve member of the flow responsive valve is a poppet biased against the valve seat, and the flow controlling orifice is a narrow flow passage through the poppet.

5. A flow sensor according to claim 4 in which the narrow flow passage is a venturi.

6. A flow sensor according to claim 1 wherein said bore means includes a plurality of flow controlling orifices.

7. A flow sensor according to claim 1, in which the means in the second fluid passage is an orifice.

8. A flow sensor according to claim 1, including a switch operable by the indicating element upon movement to an indicating position.

9. A flow sensor according to claim 1, in which the actuating element is in the form of a piston, moving in a bore into which the first and second fluid passages open.

10. A flow sensor according to claim 1, in which the actuating element is a piston of high surface area.

11. A flow sensor according to claim 1 in which the bias means for the value member is a spring.

12. A flow sensor according to claim 1, in which the bias means for the actuating element is a magnet.

13. A flow sensor according to claim 1, in which the indicating element is arranged so as to become visible after actuation.

14. A flow sensor according to claim 1, in which both the actuating and indicating elements are magnets.

15. A flow sensor according to claim 1, in which one of the actuating and indicating elements is a magnet, and one is of magnetizable material.

16. A flow sensor according to claim 1, in which the actuating and indicating elements are mutually attracting.

17. A flow sensor according to claim 1, in which the actuating and indicating elements are mutually repelling.

18. A flow sensor according to claim 1, in which the actuating element is spaced from and arranged to attract the indicating element and the bias means is arranged to retain the actuating element in a position toward the indicating element.

19. A flow sensor according to claim 1, in which the actuating element is spaced from and arranged to repel the indicating element and the bias means is arranged to retain the actuating element in a first position away from the indicating element.

UNITED STATES PATENT AND TRADEMARK OFFICE
CERTIFICATE OF CORRECTION

PATENT NO. : 4,205,703
DATED : June 3, 1980
INVENTOR(S) : Bernard F. Silverwater It is certified that error appears in the above-identified patent and that said Letters Patent are hereby corrected as shown below:

[54] In first line of the title after "FLUID" insert --FLOWS--.
Column 1, line 1 : after "FLUID" insert --FLOWS--.
Column 1, line 10: "temperature" should be --temperatures--.
Column 1, line 66: "extroadinary" should be --extraordinary--.
Column 3, line 8 : "of" should be --or--.
Column 3, line 42: "a" second occurrence should be --an--.
Column 6, line 56: omit "the" after "pressure".
Column 9, line 9 : "the" should be --to--.
Column 9, line 29: "th" should be --the--.
Column 12, line 4: "value" should be --valve--.

Signed and Sealed this

Second Day of September 1980

[SEAL]

Attest:

SIDNEY A. DIAMOND

Attesting Officer

Commissioner of Patents and Trademarks